US011297364B2

(12) United States Patent
Sorkin et al.

(10) Patent No.: US 11,297,364 B2
(45) Date of Patent: Apr. 5, 2022

(54) VIDEO CONTENT STREAMING BITRATE SELECTION USING AN EDGE COMPUTING SYSTEM FOR IMPROVING USER EXPERIENCE

(71) Applicant: Synamedia Limited, Staines Upon Thames (GB)

(72) Inventors: Max Sorkin, Mevaseret Zion (IL); Steve Epstein, Hashmonaim (IL)

(73) Assignee: SYNAMEDIA LIMITED, Staines Upon Thames (GB)

( * ) Notice: Subject to any disclaimer, the term of this patent is extended or adjusted under 35 U.S.C. 154(b) by 0 days.

(21) Appl. No.: 16/691,093

(22) Filed: Nov. 21, 2019

(65) Prior Publication Data

US 2021/0160558 A1 May 27, 2021

(51) Int. Cl.
| | |
|---|---|
| *H04N 21/2662* | (2011.01) |
| *H04L 41/147* | (2022.01) |
| *H04N 21/258* | (2011.01) |
| *H04N 21/442* | (2011.01) |
| *H04N 21/45* | (2011.01) |
| *H04N 21/643* | (2011.01) |

(52) U.S. Cl.
CPC ....... *H04N 21/2662* (2013.01); *H04L 41/147* (2013.01); *H04N 21/25841* (2013.01); *H04N 21/44209* (2013.01); *H04N 21/4524* (2013.01); *H04N 21/643* (2013.01)

(58) Field of Classification Search
CPC ......... H04N 21/2662; H04N 21/44209; H04N 21/643; H04N 21/4524; H04N 21/25841; H04L 41/147
See application file for complete search history.

(56) References Cited

U.S. PATENT DOCUMENTS

| 9,712,408 | B2* | 7/2017 | Phillips | .............. H04L 65/4084 |
| 2009/0191877 | A1* | 7/2009 | Jang | ..................... H04W 16/14 |
| | | | | 455/438 |
| 2013/0091248 | A1 | 4/2013 | Viswanathan et al. | |

(Continued)

FOREIGN PATENT DOCUMENTS

| WO | WO-2018082988 | 5/2018 |
| WO | WO-2018101554 | 6/2018 |

OTHER PUBLICATIONS

J. Jiang, V. Sekar, and H. Zhang. "Improving fairness, efficiency, and stability in http-based adaptive video streaming with festive," School of Computer Science, Carnegie Mellon University, Technical Report, Jun. 2012.

(Continued)

*Primary Examiner* — Yassin Alata
(74) *Attorney, Agent, or Firm* — Finnegan, Henderson, Farabow, Garrett & Dunner, LLP

(57) ABSTRACT

A method for providing data to a device includes receiving a location of the device, determining a network cell associated with the location, determining network traffic at the network cell and at other network cells, receiving a request for a data stream from the device, and optimizing a net user satisfaction by selecting a bitrate for the data stream based on a plurality of bitrates associated with streaming to other devices located within the network cell and the network traffic at the other network cells, wherein the net user satisfaction is an average of user satisfactions.

22 Claims, 8 Drawing Sheets

(56) References Cited

U.S. PATENT DOCUMENTS

| | | | | |
|---|---|---|---|---|
| 2013/0308521 | A1* | 11/2013 | Mikhail | H04W 72/085 |
| | | | | 370/315 |
| 2015/0134771 | A1* | 5/2015 | Kalman | H04L 65/4084 |
| | | | | 709/217 |
| 2015/0263916 | A1* | 9/2015 | Phillips | H04L 65/80 |
| | | | | 709/224 |
| 2016/0088054 | A1 | 3/2016 | Hassan et al. | |
| 2019/0058750 | A1* | 2/2019 | Bouvigne | H04N 19/147 |
| 2019/0132413 | A1* | 5/2019 | Don | H04L 67/2847 |
| 2019/0387426 | A1 | 12/2019 | Lee | |
| 2020/0028782 | A1* | 1/2020 | Li | H04L 43/0894 |

OTHER PUBLICATIONS

J. J. Quinlan, A. H. Zahran, K. K. Ramakrishnan and C. J. Sreenan, "Delivery of adaptive bit rate video: balancing fairness, efficiency and quality," The 21st IEEE International Workshop on Local and Metropolitan Area Networks, Beijing, 2015, pp. 1-6.

C. Cahir, "Approaches to Adaptive Bitrate Video Streaming," MS Thesis, School of Computing Science, College of Science and Engineering, University of Glasgow, Mar. 2014.

Abdelhak Bentaleb, Ali C. Begen, Saad Harous, and Roger Zimmermann, "Want to Play DASH? A Game Theoretic Approach for Adaptive Streaming over HTTP," MMSys'18, 9th ACM Multimedia Systems Conference, Jun. 12-15, 2018, Amsterdam, Netherlands. ACM, New York, NY, USA, 14 pages.

Kevin Spiteri, Ramesh Sitaraman, and Daniel Sparacio, "From Theory to Practice: Improving Bitrate Adaptation in the DASH Reference Player," MMSys'18, 9th ACM Multimedia Systems Conference, Jun. 12-15, 2018, Amsterdam, Netherlands. ACM, New York, NY, USA, 15 pages.

International Search Report, International Application No. PCT/US2020/060789 for Synamedia Limited, dated Mar. 3, 2021 (16 pages).

Rahman Waqas Ur et al., "Edge Computing Assisted Joint Quality Adaptation for Mobile Video Streaming," IEEE Access, vol. 7, Sep. 10, 2019 (Sep. 10, 2019), pp. 129082-129094.

* cited by examiner

VIDEO CONTENT STREAMING BITRATE SELECTION USING AN EDGE COMPUTING SYSTEM FOR IMPROVING USER EXPERIENCE

TECHNICAL FIELD

The present disclosure relates to systems and methods for distributing content, and more particularly, to systems and methods for selecting bitrate for content distribution and for distributing the content to user devices.

BACKGROUND

Content delivery involves sending an encoded data signal over a fully managed and closed network. Previously, a fixed amount of bitrate was reserved within the network for a video service or a group of video services to guarantee reliable video transmission to client devices such as set-top boxes (STB) or television sets with built-in decoders. Examples of such networks are data over cable service interface specification (DOCSIS) networks, cable networks, or direct-to-home (DTH) satellite networks. But the advent of streaming services using adaptive bitrate (ABR) technology disrupted this traditional video delivery model. ABR enabled streaming data over fixed and mobile data networks to a variety of devices such as smartphones, tablets, and smart television sets using variable dynamically changing bitrate.

ABR streaming is a method of video streaming over Hypertext Transfer Protocol (HTTP) where the source content is encoded at multiple bitrates, and each of the different streams are segmented into small multi-second segments. The streaming client device is made aware of the available streams at different bitrates and segments of the streams by a manifest file. When initiating a streaming session, the client device uses the manifest file to request segments using the lowest available bitrate stream. If the client device determines that the download speed available on the network communicably connecting the client device to the streaming source is faster than the bitrate of a downloaded segment, the client device may request a subsequent segment using the next higher available bitrate. On the other hand, if the client device finds that the download speed available on the network for a segment is lower than the bitrate for the segment, and, therefore, the network throughput is diminished, the client may request a segment sent at a lower bitrate. The segment size can vary depending on the particular implementation, for example, between two and ten seconds.

The ABR method used today may be unstable, unfair, and inefficient. The ABR method may be unfair because some of the user devices may get a larger bitrate than other user devices located in the same network cell. The ABR method may be unstable because some of the user devices may have fluctuations in the bitrate resulting in an overall unsatisfactory experience for users of those user devices. Further ABR method may be inefficient if bitrate used for the user devices in the network cell is lower than a possible bitrate that can be provided to the user devices.

SUMMARY

The ABR method may be significantly improved by improving several factors of the ABR method, such as stability, fairness, and efficiency. In some cases, the three characteristics may be improved with improved ABR algorithms that may take into account predictive scheduling, bitrate estimation (e.g., by estimating an average bitrate computed over a selected time window), or any other suitable approaches that result in various user devices obtaining, on average, the same bitrate (that may change over time due to changes in a network traffic for the network cell).

In many instances, to improve overall satisfaction with data streaming for the user, user dissatisfaction due to bitrate loss should be taken into account. Such dissatisfaction (also referred to as loss aversion) states that people dislike loss much more than they like a gain. See Kahneman, D. & Tversky, A. (1979). "Prospect Theory: An Analysis of Decision under Risk." Econometrica. 47 (4): 263-291. This dissatisfaction is frequently observed for users consuming streaming content. It is observed that people may not need to increase the resolution of the streaming content, but once the resolution is increased, the people object to a decrease in the resolution.

The stability of the streaming data is another characteristic that users prefer. For example, when a user device is moving within a mobile network (e.g., a user device is moving from one network cell to another), the bitrate for the user device may change rapidly. For example, if the user device moves from a network cell with light network traffic to another network cell with heavy network traffic, the bitrate available to the user may drop rapidly. For such cases, the user device may have no means of a priori adapting to a change in the network traffic, and may only respond by accepting a decrease in the bitrate. Similarly, when a user device is moving to a network cell with lighter network traffic, an increase in the bitrate may not be enjoyable if the increase occurs only for a short duration of time. The fluctuations in the bitrate are expected to become more problematic as the network cells become smaller with the advent of the fifth generation (5G) wireless technology and/or using a millimeter-wave electromagnetic spectrum or even a smaller wavelength spectrum (e.g., visible spectrum).

The advent of the 5G wireless networking architecture, which aims to increase data communication speeds by up to three times compared to its predecessor (fourth-generation (4G) wireless technology), enables intelligent applications to be deployed at edge computing systems of the network and at the same time be made aware (by the 5G multi-access edge computing (MEC) infrastructure) of both the location of user (e.g., client) devices and any network congestion. Such intelligent applications may be used to control the allocation of the bitrate for a user device and may optimize the fairness, stability, and efficiency of the streaming data. Additionally, the applications may be designed to improve a user experience when the user is consuming the streaming content by reducing or preventing the loss aversion. The applications may also be designed to improve a user experience when the user is moving from a network cell to an adjacent network cell.

Implementing ABR managing algorithms at a server (e.g., a server associated with one of the edge computing systems deployed within 5G wireless networking architecture) makes it possible to meet the requirements of fairness, stability and efficiency in a more precise manner since server software application, unlike client software application installed on user devices, may have a full knowledge of the network traffic. Further, the server software applications may account for user dissatisfaction associated with the loss aversion by predicting network traffic based on historical network traffic patterns across all times, days, and seasons.

Also, implementing ABR on a server and preloading video on demand (VOD) packets before entering a highly congested network cell may enable smoothing a change in the bitrate associated with user devices moving from one network cell to another as further described below.

Consistent with a disclosed embodiment, a method for providing data to a device includes receiving a location of the device, determining a network cell associated with the location, determining network traffic at the network cell and at other network cells, receiving a request for a data stream from the device, and optimizing a net user satisfaction by selecting a bitrate for the data stream based on a plurality of bitrates associated with streaming to other devices located within the network cell and the network traffic at the other network cells, wherein the net user satisfaction is an average of user satisfactions.

Consistent with another disclosed embodiment, a system comprising of one or more edge computing systems communicatively coupled to one or more devices is provided. The system includes at least one edge computing system for performing operations. The operations include receiving a location of the device, determining a network cell associated with the location, determining network traffic at the network cell and at an adjacent network cell, receiving a request for a data stream from the device, and optimizing a net user satisfaction by selecting a bitrate for the data stream based on a plurality of bitrates associated with streaming to other devices located within the network cell and the network traffic at the adjacent network cell, wherein the net user satisfaction is an average of user satisfactions.

Consistent with another disclosed embodiment, a non-transitory computer readable medium is provided. The non-transitory computer readable medium includes instructions that, when executed by at least one processor, cause the at least one processor to perform operations. The operations include receiving a location of a device, determining a network cell associated with the location, determining a motion vector for the device, determining network traffic at the network cell and at an adjacent network cell to which the device is moving, receiving a request for a data stream from the device, and optimizing a user satisfaction by selecting a bitrate for the data stream based on the network traffic at the network cell and the network traffic at the adjacent network cell.

The foregoing general description and the following detailed description are exemplary and explanatory only and are not restrictive of the claims.

BRIEF DESCRIPTION OF THE DRAWINGS

The accompanying drawings are not necessarily to scale or exhaustive. Instead, the emphasis is generally placed upon illustrating the principles of the embodiments described herein. These drawings, which are incorporated in and constitute a part of this specification, illustrate several embodiments consistent with the disclosure, and, together with the detailed description, serve to explain the principles of the disclosure. In the drawings.

DETAILED DESCRIPTION

Reference will now be made in detail to exemplary embodiments discussed with regard to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The disclosed embodiments relate to systems streaming multimedia content, such as live broadcast channels (e.g., news channels, sports channels, movie channels, and the like) over a content delivery network (CDN). The broadcasting system may stream live television broadcasts or service on-demand content (e.g., movies). The present disclosure describes aspects of a system and a method for controlling the allocation of a bitrate for streaming content based on information available about the network traffic. The implementation described herein uses an edge computing system to determine the allocation of a bitrate for user devices served by the edge computing system.

Implementing the bitrate allocation algorithms at the edge computing system improves fairness, stability, and efficiency of the bitrate allocation. The algorithms may have access to information about network traffic for a network cell served by the edge computing system. The network traffic information may include predictions of the network traffic based on historical network traffic patterns across all times, days, and seasons. The bitrate allocation algorithms, implemented as one or more software applications, may account for user dissatisfaction associated with the loss aversion and may be configured to reduce the user dissatisfaction. Furthermore, the algorithms, when implemented at the edge computing system level, may enable smoothing any change in a bitrate associated with user devices moving from one network cell to another. Such smoothing may be accomplished by temporarily allocating an extra amount of bandwidth to the mobile devices that are merging from a network cell experiencing light network traffic to a congested network cell. Such devices are said to be "driving into traffic," and, without receiving an extra amount of bandwidth may be required to decrease their bitrate suddenly.

Figure 1:
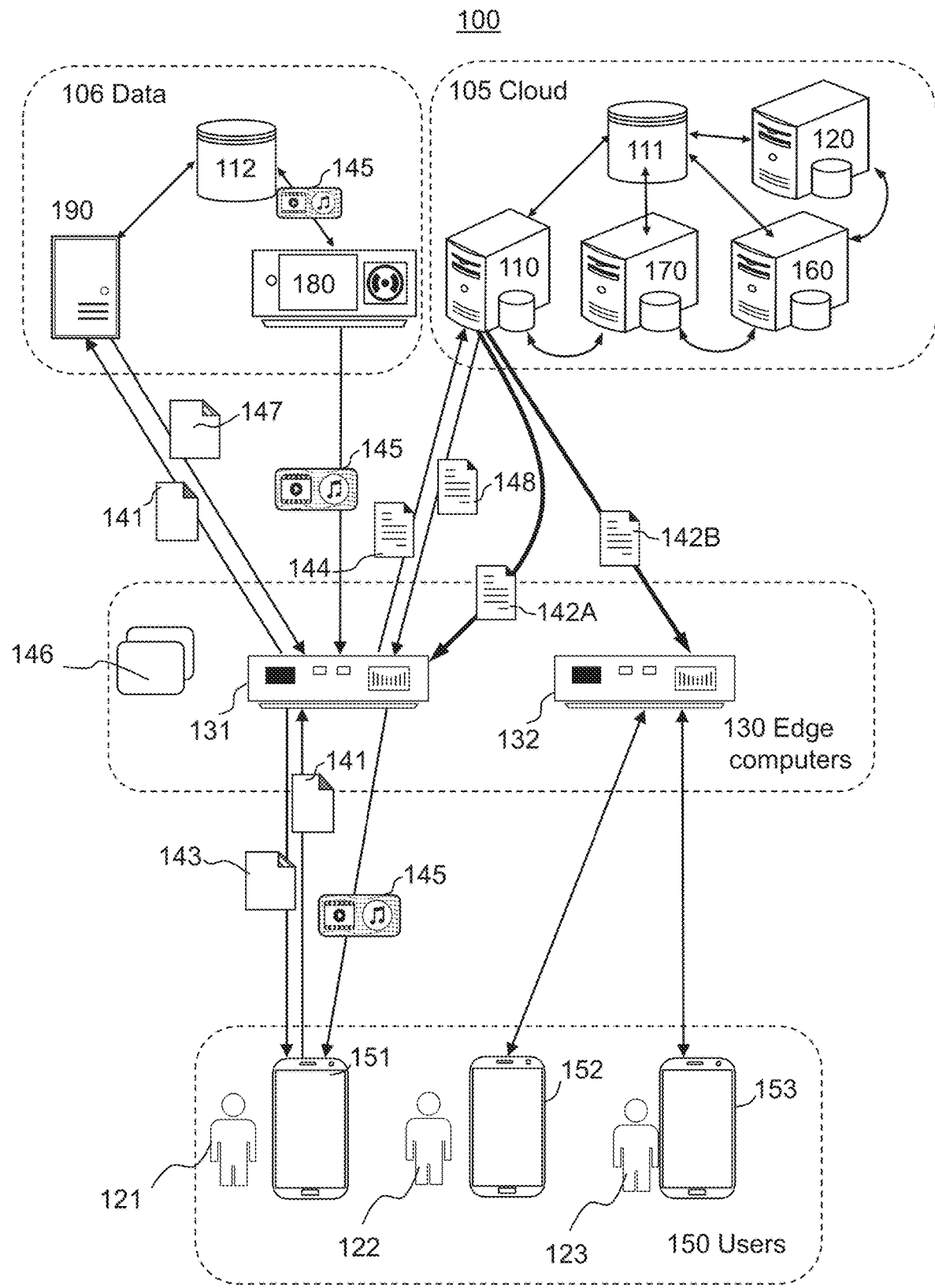
FIG. 1 is an example system for controlling the allocation of a bitrate for user devices consistent with disclosed embodiments.

A system 100, as shown in FIG. 1, according to this disclosure, may include a cloud system 105, edge computing systems 130, and user devices 150. Devices of cloud system 105 may be communicatively connected to edge computing systems 130, and edge computing systems 130 may be communicatively connected to user devices 150. For example, FIG. 1 shows an edge computing system 131 communicatively connected to a device 151, and an edge computing system 132 communicatively connected to devices 152 and 153. In an example, embodiment a user 121 may operate device 151, a user 122 may operate device 152, and a user 123 may operate device 153. In various embodiments, user devices 150 may be mobile devices located in various network cells. As used herein, unless otherwise noted, a network cell may be a land area served by one fixed-location transceiver associated with the network cell.

Mobile devices 150 may communicate with the transceiver to receive streaming data. In some embodiments, more than one transceiver is used for a given network cell, and in some cases, one transceiver may serve several network cells. A transceiver may transmit and receive data and may be a cell tower, cellular base station, and the like. For a 5G network, a transceiver may cover a land area corresponding to a city block, a few city blocks, and the like. For example, transceiver may cover a small land area (e.g., a quarter of a square kilometer, one square kilometer, a few square kilometers, a few tens of square kilometers, and the like) and include a low-power, short-range wireless transmission systems (base stations) to cover such a small geographical area. In some cases, a mobile network may include several scales of communication. For example, besides having transceivers covering local network cells, larger, more powerful (global) transceivers may also cover groups of network cells. In some cases, larger global transceivers may deliver a lower bitrate to user devices than smaller transceivers. In various embodiments, various transceivers (e.g., several smaller transceivers, and several larger global transceivers) may serve land areas that may overlap. The local transceivers may be connected to edge computing systems (e.g., systems 130, as shown in FIG. 1) associated with such transceivers. In an example embodiment, one edge computing system and one transceiver may serve a network cell, and in some other embodiments, more than one edge computing system and/or more than one transceiver may serve the network cell. Alternatively, a single edge computing system and/or transceiver may cover more than one network cell when necessary. In some cases, the size of the network cell may be dynamically adjusted depending on network traffic in the network cell. For example, if the network cell experiences lighter traffic, the network cell may be expanded. In some cases, if the network cell experiences heavier traffic, multiple transceivers, and/or edge computing systems may be used for the network cell.

In various embodiments, an edge computing system (e.g., system 131) may be a multi-access edge computing (MEC) system capable of transmitting data to multiple user devices 150. In an example embodiment, system 131 may include a network adaptive bitrate application 146 executed by one or more processors of system 131. Application 146 may determine bitrate allocation for each user device (e.g., user device 151) communicatively connected to system 131. Application 146 may determine bitrate allocations by analyzing traffic in the network cell and by optimizing the quality of experience (QoE) goals that include fairness, loss aversion, and stability of the data stream (i.e., the requirement that the data stream bitrate does not significantly change with time). It should be noted that application 146 may be configured to determine bitrate allocation for user device 151 when user device 151 is connected to system 131 and located in a network cell associated with system 131 (herein referred to as a first network cell). As user device 151 moves to another network cell (herein referred to as a second network cell) associated with a different edge computing system (e.g., edge computing system 132), ABR server 160 may be configured to transmit to system 132 the bitrate allocation for device 151 that was used when device 151 was in the first network cell. Such information may be used by system 132 to provide a similar bitrate allocation for device 151 as device 151 moves from the first network cell to the second network cell. Subsequently, application 146 of system 132 may be configured to modify the allocation bitrate for user device 151. In various cases, adaptive bitrate applications 146 of edge computing systems 130 and ABR server 160 are configured to provide user 121 with optimal quality of experience when user 121 moves from the first network cell to the second network cell.

Cloud system 105 may include one or more servers for communicating with edge computing systems 130, and for analyzing traffic data and data related to user preferences. In an example embodiment, FIG. 1 shows communication server 110, a network analytics server 120, an adaptive bitrate selection server 160 (ABR server 160), and content and viewing behavior analytics server 170 (CVBA server 170). Server 120 may collect information about the network traffic and transmit the network traffic information to ABR server 160. Further, network analytics server 120 may be configured to predict network traffic over the network cells and determine traffic flow patterns within the network cells. The information determined by server 120 may be transmitted to server 160 for determining a bitrate selection policy for an edge computing system (e.g., system 131).

The policy may include bitrate allocation rules for user devices (e.g., device 151) connected to edge computing system 131. The bitrate allocation rules may include suggesting time intervals during which bitrate for streaming data to user device 151 is constant or nearly constant (such time periods are also referred to as stability periods). In some cases, stability periods may include time intervals where the bitrate does not substantially change. For example, the stability period may correspond to a time interval when the bitrate fluctuates by less than ten percent, twenty percent, and the like. In some cases, stability periods may depend on a type of content (e.g., whether the content is a live stream, video-on-demand, and the like), genre of the content, a screen size of a user device, and the like. Further, stability periods may depend on network traffic in the neighborhood edges. In addition to determining stability periods for edge computing system 131, the bitrate selection policy may include suggesting bitrate allocation for user device 151 based on traffic in a network cell in which device 151 is located (i.e., network cell of device 151), as well as traffic in neighboring network cells of a network cell of device 151. In some cases, nearest neighboring network cells of the network cell of device 151 may be considered, and in other cases, other network cells (e.g., cells that are adjacent to the nearest neighboring network cells) may be considered. In some cases, for a moving mobile device, the velocity (both velocity direction and magnitude) of mobile user device 151 may be taken into account when determining bitrate selection policies for the data streaming to the moving mobile device. For instance, if the mobile device is steadily moving southbound, traffic for network cells in the southbound direction from device 151 may be considered for determining bitrate selection policies.

In various embodiments, server 160 may communicate selection policy to server 110, and server 110 may distribute the selection policies to edge computing systems 130. For example, server 110 may distribute a selection policy 142A to edge computing system 131 and a selection policy 142B to edge computing system 132. In various embodiments, distribution of edge selection policies may be done periodically at repeated time intervals, or the policies may be distributed on a need basis. For example, server 110 may request selection policies from server 160 for each edge computing system as needed. The selection policy may be changed due to seasonal changes, weather, changes related to road construction, and the like.

In various embodiments, server 120 may perform time series analysis for estimating network traffic for a particular edge computing system in a given period of time, taking into account season of the year, day of the week, time of day, and the like, as further described below. For example, server 120 may analyze time series data and data provided by CVBA server 170, and estimate the number of users and estimated traffic for a given network cell, and for a given time period. Server 120 may communicate the data analysis to server 160 to facilitate determining a selection policy for one or more edge computing systems 130. In some cases, server 160 may perform functions of server 120, and server 120 may not be present in cloud system 105.

Cloud system 105 may also include CVBA server 170, as noted above. Server 170 may be configured to collect viewing and behavioral analytics for each user device. In some cases, when a user logs into a user account to receive streaming data, server 170 may collect viewing and behavioral analytics for each user account of the user device. In an example embodiment, server 170 may collect history of content viewed by the user, user viewing tendencies, a time of the day, week or month when the user is expected to request the streaming data, duration of time the user is expected to watch a video or listen to an audio, the user feedback based on bitrate changes (e.g., if the user stops watching a video stream when a resolution of the video changes to a lower resolution due to decrease of bitrate, such user behavior may indicate that the user is particularly sensitive to loss of resolution). In an example embodiment, an edge computing system (e.g., system 131) may periodically collect (cache) data 144, and transmit data 144 to servers 120, 160, and 170 via server 110. The frequency with which data 144 may be collected and transmitted from system 131 to servers 110-170 may depend on a season, a day of the week, a time of day, and the like. Data 144 may include information about the number of user devices 150 within a network cell managed by system 131, current traffic for the network cell, information related to streaming data (e.g., the name, bitrate, or location of various data streams, or the estimated time left for consuming the data streams). The information about the streaming data may be used to predict future traffic within the network cell. For example, if user 121 has ten minutes left for consuming a data stream, server 120 may use that information to predict that user 121 will contribute to the network traffic for the next ten minutes.

In various embodiments, servers 110-170 may include one or more processors, a memory for storing programming instructions, and an interface for modifying programming instructions and controlling various parameters of the servers.

In various embodiments, system 100 may include at least one database 111 for storing various user related information, including, for example, metadata related to streaming data consumed by a user, and any other relevant user data. For example, other relevant user data may include profile data of various users of server 110 that can include user multimedia preferences, user authentication information, or any other user-related information (e.g., links to other users, and the like). Database 111 may be accessed by edge computing systems 130 and servers 110-170. In some cases, database 111 may store statistical data related to network traffic of a particular network cell or network traffic due to users connected to a given edge computing system. Such statistical data may include a total network traffic for the network cell or the edge computing system, a number of users within the network cell (or connected to the edge computing system) a standard deviation of the number of users within the network cell (or connected to the edge computing system), influx/outflux of traffic into the network cell, and the like. In various embodiments, the statistical data may be calculated for different hours of the day, for different weeks, months, seasons, and the like.

System 100 may include data system 106 that may include content delivery network (CDN) 180 for delivering various content 145 (e.g., music, videos, and the like) to user devices 150, as well as server 190 for facilitating selection of content 145 from a database 112, and transmission of content 145 to CDN 180. In various embodiments, CDN 180 may encode content 145 using an appropriate encoding algorithm (e.g., HTTP live streaming (HLS), moving picture experts group (MPEG) dynamic adaptive streaming over HTTP (MPEG DASH), and the like). In some cases, data system 106 may not be associated with cloud system 105. For example, cloud system 105 may analyze network traffic data, and user preferences, and determine bitrate selection policies using servers 110-170, and CDN 180 of data system 106 may be used to deliver content 145 to edge computing systems 130. In an example embodiment, cloud 105 may be controlled by a first business entity, and data system 106 may be controlled by a second business entity. Alternatively, data system 106 may be part of cloud system 105.

FIG. 1 shows, as previously noted, that user devices 150 may be communicatively connected to edge computer systems 130, and edge computer systems 130 may be communicatively connected to cloud system 105 and data system 106. In an example embodiment, a request 141 from a user device (e.g., device 151) may be communicated to edge computing system 131. Request 141 may include a request for content by device 151. Request 141 may include content identifying information, parameters of a user device (e.g., a screen size of the device, whether the device is a mobile or a static device, and the like), account information of a user, and last (or current) bitrate allocation for the user device. In various embodiments, request 141 may include a request for a manifest file 143, as shown in FIG. 1.

Manifest file 143 may be transmitted by an edge computing system to a user device (e.g., edge computing system 131 may transmit manifest file 143 to user device 151, as shown in FIG. 1). In an example embodiment, more than one request 141 may be communicated from device 151, and more than one manifest file 143 may be delivered from system 131 to device 151. The frequency of requests 141 may depend on a type of a player used by device 151, type of content requested by device 151, and the like. For example, for a live data stream, requests 141 may be produced as the data stream is transmitted to user device 151. In an example embodiment, request 141 may correspond to a portion of content 145, and manifest file 143 may correspond to a set of segments of the portion of content 145. For instance, manifest file 143 may contain references to segments for content 145 encoded at a single selected bitrate, with the selected bitrate may be determined by application 146 of edge computing system 131. The selection of the bitrate may depend on a type of content and may be determined to prevent user dissatisfaction due to bitrate loss, and bitrate fluctuations associated with users entering and exiting a network cell. Further bitrate may be determined to facilitate fairness of the bitrate for different devices 150. Further determination of the selected bitrate may be facilitated by ABR server 160. For example, ABR server 160 may facilitate a smooth change of bitrate for content 145 when user device 151 transitions from one network cell to another.

In various embodiments, request 141 may be transmitted to server 190, and server 190 may transmit to edge computing system 131 information 147 that can be used by system 131 to produce one or more manifest files 143. Further server 190 may request database 112 to upload content 145 to CDN 180. Alternatively, system 131 may use information 147 to download content 145 from CDN 180. In an example embodiment, server 190 may receive content identifying information via request 141 and transmit to edge computing system 131 information 147 that includes a link to content 145. Server 190 may include at least one processor for performing various tasks, such as receiving data 141 from edge computing systems 130, decrypting data 141, for cases when the data is encrypted, analyzing data 141 (e.g., determining what type of multimedia is being requested by a user device, authenticating user devices 150 via system 131, and the like), and facilitating retrieval of multimedia content 145 requested by user devices 150. CDN 180 may obtain content from database 112, encrypt and/or encode the content, and transmit the encrypted content to one or more edge computing systems 130.

System 131 may be configured to download at least a portion of content 145 from CDN 180, split the downloaded portion of content 145 into one or more segments, and store the segments in a memory associated with system 131. Additionally, system 131 may be configured to create manifest file 143 with links to the segments. In various embodiments, application 146 may be configured to create manifest file 143 and manage data associated with the segments corresponding to the portion of content 145. Application 146 may further be configured to encode the segments at a selected bitrate, create manifest files 143 referencing the segments encoded at the selected bitrate, and/or encrypt the segments prior to transmitting the segments of content 145 to user device 151. In various embodiments, when encoding the segments of content 145 and creating manifest file 143, application 146 may take into account policy 142A, as well as a current state of the network (e.g., the network traffic) of the network cell of user device 151 and neighboring network cells. Data 148 related to the current state of the network (e.g., network traffic of neighboring network cells and/or any other relevant network cells), may be communicated to computing system 131 from server 110. Data 148 may be used by application 146 of system 131 to select bitrate for segments of content 145 based on a bandwidth available for computing system 131 and policy 142A.

User device 151 may receive a portion of content 145, play the received portion using a playback application (herein referred to as a player) and, while playing the portion of content 145, submit another request 141 to system 131. In various embodiments, the player of device 151 may be compatible with standard manifest files and may be configured to retrieve segments of content 145 from edge computing system 131. In addition to playing content 145, the player of device 151 may report current bitrate and other device parameters (e.g., a screen size of the device, an account associated with user 121, and the like) as a part of request 141.

In some cases, when a portion of content 145 can be preloaded on user device 151 (i.e., when content is not a live data stream), the player of device 151 may be configured to preload data segments of content 145 if the allocated bitrate for device 151 is sufficiently large to allow preloading of the data segments. Since adaptive bitrate application 146 is configured to control the bitrate allocation for device 151 and bitrate for the data segments of content 145, application 146 may control how many segments can be preloaded during playback of content 145. In an example embodiment, application 146 may be configured to increase allocated bitrate for device 151 when device 151 is moving into a highly congested network cell resulting in preloading multiple data segments of content 145 before device 151 enters the congested network cell.

In one example embodiment, content 145 may be transmitted to system 131 and prepared for transmission to user device 151. In some cases, when content 145 is, for example, a video-on-demand, content 145 may be uploaded to system 131 and split into segments as described above. Alternatively, when content 145 corresponds to live streaming data, content 145 may be continuously transmitted to system 131, and subsequently transmitted to user device 151. Additionally, system 131 may be configured to create multiple manifest files corresponding to different segments associated with the live streaming data of content 145. In an example embodiment, edge computing system 131 may obtain bitrate selection policy 142A from server 160, determine bitrate for each device using application 146 and transmit content 145 to device 151. Content 145 is first transmitted from CDN 180 to system 131, and CDN 180 may encode content 145 and transmit multiple copies of content 145 encoded for different bitrates and video formats. Application 146 may select a particular copy of encoded content 145 based on a selected bitrate for segments of content 145.

In some embodiments, the selected bitrate by application 146 may be presented as an allowable bitrate range, and in some cases, application 146 may allow edge computing system 131 to vary bitrate such that an average bitrate for device 151 is within an allowable bitrate range, or correspond to an allowable bitrate value. The bitrate range may be determined by application 146. In various embodiments, system 131 may estimate the average bitrate by averaging the served bitrate over a time window corresponding to time needed to start and finish watching the show. In some cases, the time window may be predetermined by application 146 and may be one minute, two minutes, ten minutes, half an hour, an hour, and the like. In some embodiments, the duration of the time window may depend on a type of video consumed by a user (e.g., user 121).

Alternatively, based on information obtained from server 170, edge computing system 131 may determine an expected duration of time that user 121 is expected to consume content 145, and based on that time, calculate the average bitrate. In some cases, server 170 may estimate the duration of time that the user 121 of device 151 is expected to watch a video or listen to an audio, both of which may be represented by content 145, based on the location of device 151, time of the day, network traffic information (that can be communicated to server 170 by server 120), and the like.

As previously noted, adaptive bitrate application 146 may communicate the selected bitrate for user device 151 to ABR server 160. Such communication of the bitrate may be important if user device 151 is moving from one network cell to another. For example, when user device 151 moves through various network cells, various edge computing systems may be configured to transmit content 145. In some cases, various network cells may be configured to overlap, such that at an overlap location, several edge computing systems (e.g., systems 131 and 132) may be configured to stream data to user device 151. In an example embodiment, when device 151 is located in the overlap location, one edge computing system (e.g., system 131) may be configured to generate a first manifest file, and system 132 may be configured to generate a second manifest file. While the first manifest file may be used by the player of user device 151 to play streaming data, the second manifest file may be used to preload segments of the streaming data before the playback. It should be noted that the player of user device 151 may support a queue of multiple manifest files. Further, the player of device 151 may issue a request for a following manifest file from either system 131 or system 132, once segments of the streaming data from the previous manifest file are uploaded on user device 151. By using overlapping network cells, system 100 may support increased bitrate for devices located in the overlap location, allowing for user devices to cache the streaming data when entering congested network cells. As previously noted, ABR server 160 may be used to communicate information about bitrate allocation for user device 151 from one network cell to another. For example, if user device 151 had a first bitrate in the first network cell, and is entering a second network cell managed by, for example, edge computing system 132, ABR server 160 may communicate information about the first bitrate to application 146 of system 132, to ensure smooth streaming experience for user 121 of user device 151. For example, system 132 may be configured to use the first bitrate for user device 151 during a transitional period from the first network cell to the second network cell. The transitional period may be a period of time that may last a predetermined duration of time (e.g., 30 seconds, one minute, a few minutes, and the like).

In some embodiments, ABR server 160 may be configured to provide policies 142A and 142B, while information about the first bitrate in the first network cell managed by computing system 131 may be communicated directly to computing system 132 that manages the second network cell. For example, when device 151 moves from the first network cell to the second network cell, device 151 may submit request 141. Request 141 may contain data indicating the first bitrate (i.e., the bitrate that was used in the first network cell). In such a case, computing device 132 may take into account the first bitrate obtained within request 141, policy 142B from ABR server 160, as well as current network traffic for the second network cell to determine the second bitrate. In an example embodiment, the second bitrate may be the same as the first bitrate during a transitional period from the first network cell to the second network cell.

In some cases, server 170 may determine that content 145 may correspond to a particular program (e.g., a show that the user was waiting for, such as a sporting event) that may be consumed by a user (e.g., user 121) in its entirety. Such information about a type of content 145 that user 121 is consuming may also affect an estimate of how long user 121 is expected to consume content 145. In some cases, when it is determined that content 145 is a favorite content of user 121, server 170 may provide an indication to application 146 about a favorability of content 145, and application 146 may take the indication into account when determining the bitrate for user device 151 of user 121. In some embodiments, when requesting content via request 141, request 141 may include user's information (e.g., preferences for a type of content), information about user habits (e.g., user 121 watches sports during a train commute to work), and the like. This information may be considered by application 146 when determining the bitrate for user device 151 of user 121.

In various embodiments, database 112 of data system 106 may store data related to different streaming content. In some cases, database 112 may store information related to the encoding of the content. For example, if an encoding is found for a video stream that adapts to the stream and maintains a constant target video quality (VQ), or maintains the target VQ within a range of values, such encoding may be stored in database 112. The preferred encoding may be communicated to an edge computing system (e.g., system 131) via data 147 or as a part of data 145, as shown in FIG. 1, and may be used by application 146 for encoding segments of content 145. Allowing edge computing system 131 to provide the encoding of broadcast may be beneficial in order to provide segments at a selected bitrate to user devices 150. Further processing at edge computing system 131 reduces the computational load for CDN 180. For example, in some cases, CDN 180 may be serving thousands or millions of user devices, and requiring CND 180 to do encoding for each requested content may lead to delay in content transmission. Alternatively, considering that edge computing system 131 serves only a limited number of devices (e.g., one device, ten devices, a hundred devices, a few thousand devices, or a few tens of thousands of devices) that may request the content at about the same time, edge computing system 131 may have a sufficient amount of processing power to encode content for all of the content receiving user devices 150.

Figure 2:
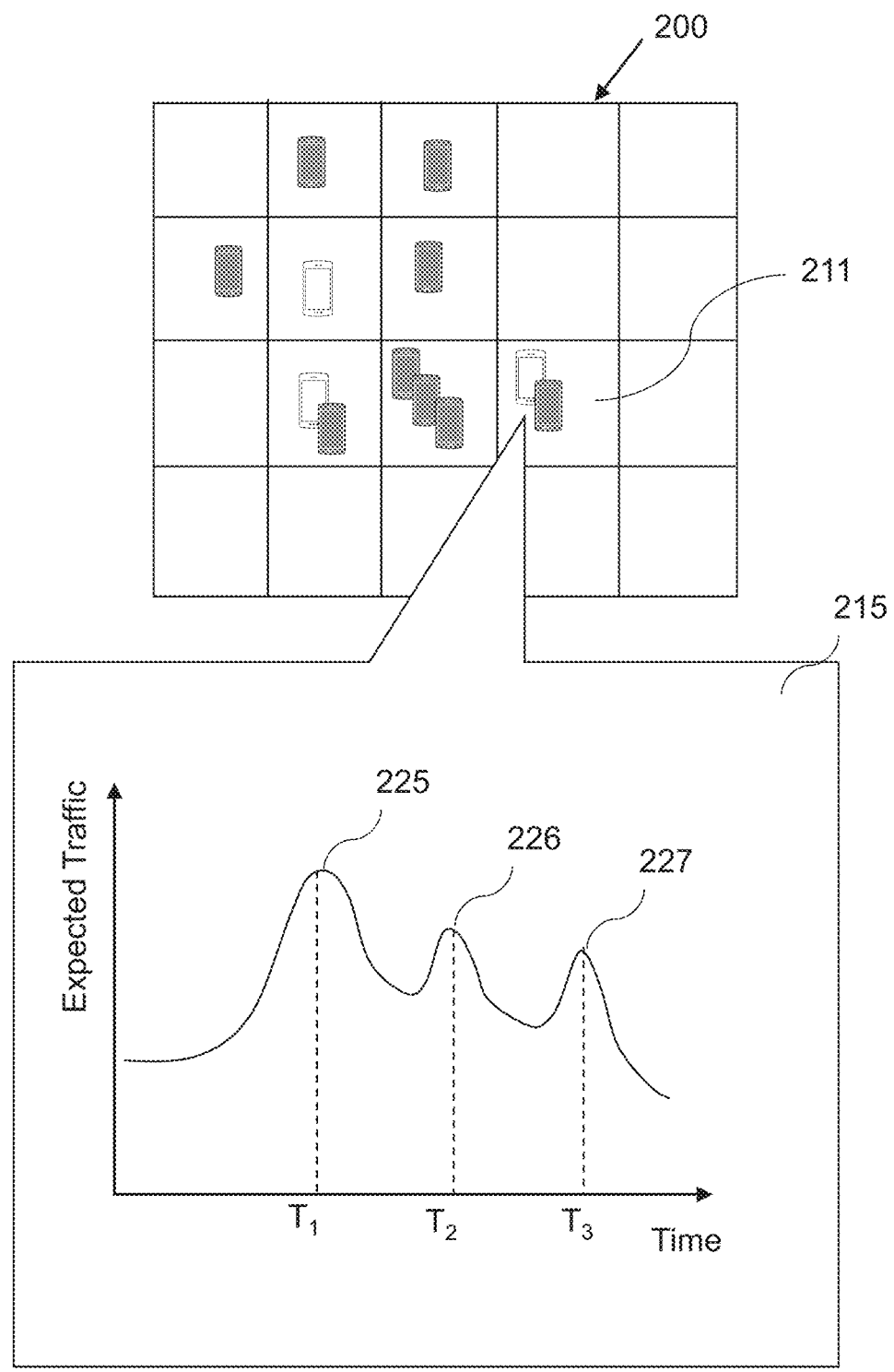
FIG. 2 is an example map of network cells with expected average network traffic estimated for each cell consistent with disclosed embodiments.

FIG. 2 shows an example map of network cells 200 with various network cells (e.g., a network cell 211), including an indication for network traffic. Any suitable indication for the network traffic may be used. For example, in FIG. 2, the indication for the network traffic is represented by the number of mobile devices shown for each cell. As noted before, server 120 may collect information about the network traffic and transmit the network traffic information to ABR server 160. In various embodiments, server 120 may be further configured to predict future network traffic. For example, graph 215 shows expected traffic as a function of time during a selected day of the week. Server 120 may use any suitable means for predicting the network traffic during the day. For example, server 120 may access data for the network traffic collected for previous days and obtain the estimate for the network traffic for a given day by averaging the data for the network traffic for previous days. For instance, data related to network traffic for previous Sundays may be collected and averaged to obtain the estimate for the network traffic for Sundays. In some cases, more sophisticated approaches may be used, such as time series analysis or machine-learning algorithms. In an example embodiment, seasonal autoregressive integrated moving-average (SARIMA) method may be used to identify daily, weekly and seasonal patterns when predicting future network congestion.

In some cases, network traffic may be affected by a particular event, and such an event may be accounted for by server 120. For example, if there is a particular event on Sunday (e.g., a concert), such an event may modify regular network traffic and may be accounted for by analyzing network traffic for previous Sundays that had a similar event.

In some cases, network traffic may depend on unpredictable events (e.g., traffic jams, accidents on roads, congestion due to weather, hurricanes, tornados, fires, earthquakes, and the like). In some cases, the network traffic may lag behind physical traffic (e.g., roadway traffic related to road congestion), and may be predicted by analyzing the physical traffic. For example, server 120 may be configured to analyze the traffic on the roads (e.g., may identify roadway traffic jams) and based on the information about the traffic jam (e.g., information about how fast the cars are moving) estimate the network traffic.

As shown in graph 215 in FIG. 2, server 120 may estimate several points in time (e.g., time points $T_1$, $T_2$, and $T_3$ where the network traffic may experience corresponding peaks 225, 226, and 227. For example, peak 225 may correspond to a morning commute to work time, peak 226 may correspond to lunchtime, and peak 227 may correspond to an evening after dinner time. It should be noted that each network cell may experience its unique traffic patterns. For example, peak 227 may be present for a network cell associated with a residential area, but may not be present in a commercial area. Further, it is understood that the expected traffic may change from one day to another, one week to another, one month to another, and/or the like. Further changes to the network traffic may be due to weather patterns, population changes within the area, opening or closing of roads, commercial facilities, stores, museums, parks, and the like.

In various embodiments, system 100, which may be a 4G or 5G network system with multi-access edge computing systems 130, may be configured to provide data to each application. In such configuration, network congestion may be determined by an edge computing system 131, and not necessarily by server 120. For example, server 120 may be configured to predict network traffic, but information about ongoing network traffic may be obtained by edge computing system 131. In some cases, edge computing system 131 may communicate information about the network traffic observed by system 131 to server 120 for further processing. For example, server 120 may store network traffic-related information obtained from system 131, and use such information for further predictions of the network traffic. In various embodiments, by saving network traffic data for different times, modern time series algorithms may be used to predict hourly trends, daily trends, and seasonal trends of traffic for a given network cell. In some cases, network traffic for different devices may be differentiated. For example, the network traffic for static big screen devices may be differentiated from the network traffic for mobile devices.

Figure 3A:
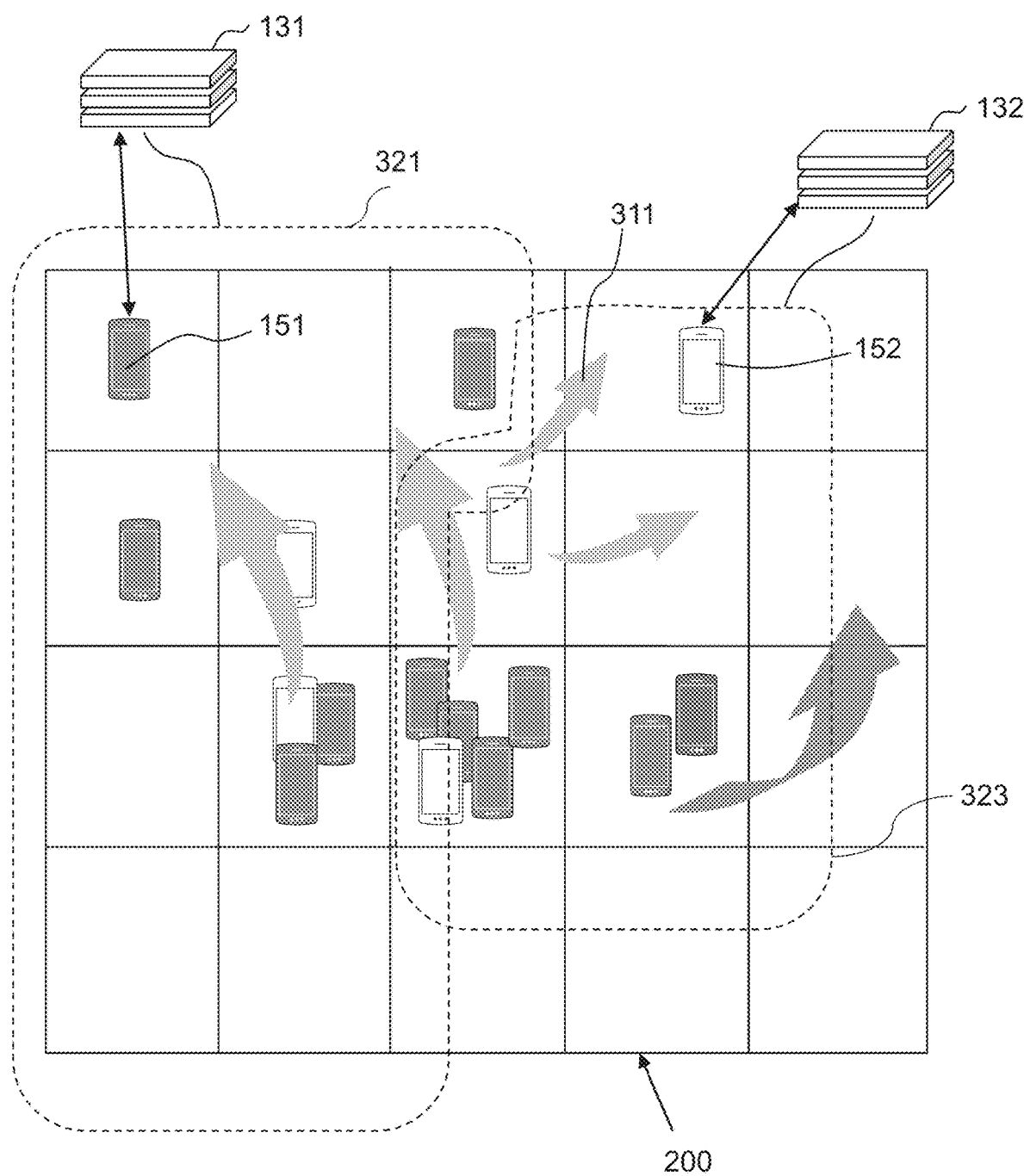
FIG. 3A shows regions of network cells that may be served by edge computing systems consistent with disclosed embodiments.

FIG. 3A shows an example embodiment where computing system 131 may serve devices in region 321, and computing system 132 may serve devices in region 323. For example, system 131 may receive/transmit data from/to mobile device 151, and system 132 may receive/transmit data from/to mobile device 152. Regions 321 and 323 may cover multiple network cells 200, as shown in FIG. 3A.

In various embodiments, server 120 may predict the network traffic by analyzing flows 311 within network cells 200. Flows within the network traffic may correspond to the physical movement of user devices 150, and may further be analyzed by analyzing the movements of devices 150. For example, if there is a congestion of cars on a road, such congestion may be expected to move along the road. Traffic flows may be analyzed using any suitable approaches (e.g., using models of traffic flow theory such as Nagel-Schreckenberg model, using transport equations, and the like).

Figure 3B:
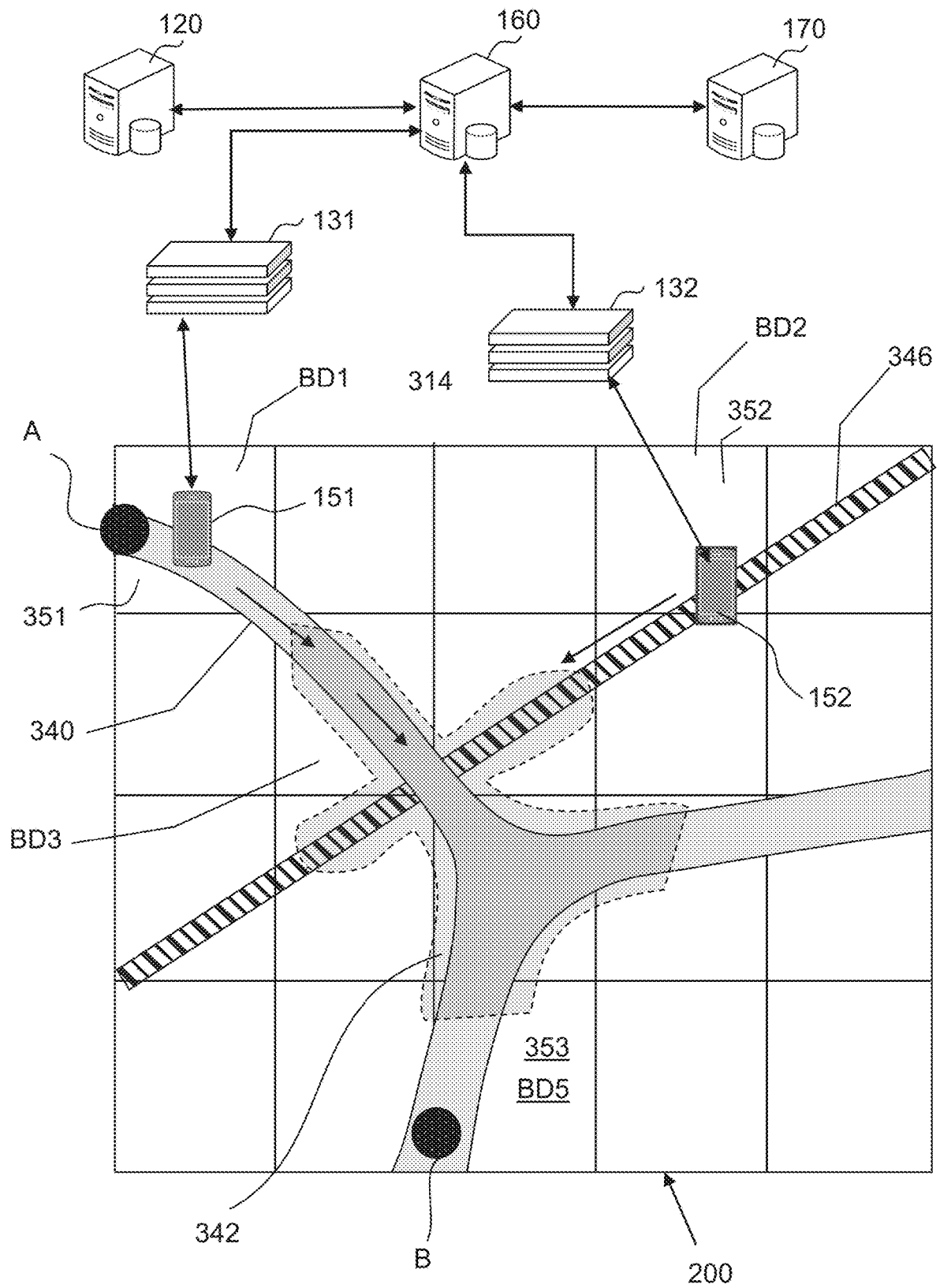
FIG. 3B shows moving mobile devices across a land area corresponding to network cells that may be served by edge computing systems consistent with disclosed embodiments.

In addition to analyzing overall traffic flows, server 120 may be configured to track the motion of individual user devices. For example, FIG. 3B shows user device 151 that is moving along a roadway 340 and user device 152 that is moving along a railroad track 346. User devices 151 and 152 may communicate with their respective edge computing systems 131 and 132 that may collect location information about devices 151 and 152 and communicate the location information to server 120. Server 120 may be configured to analyze the motion of the devices 151 and 152 and predict future locations of these devices. For example, server 120 may predict that device 152 may continue moving along the railroad track 346, and device 151 may continue to move along the roadway 340. Server 120 may predict future locations of user devices 151 and 152 by extrapolating their location based on the velocity of the devices, and/or server 120 may predict device motion based on historically observed data. For example, if device 151 frequently moves from point A to point B, as shown in FIG. 3B, then server 120 may conclude that device 151 may proceed along roadway 340 and reach a congested region 342. Similarly, server 120 may conclude that device 152 may proceed along the railroad track 346 and reach a congested region 342. In various embodiments, network cells 351 and 352 may have light network traffic, and server 120 may communicate network traffic information to respective computing systems 131 and 132. System 131 may determine that a high bitrate BD1 may be available to device 151, and system 132 may determine that a high bitrate BD2 may be available to device 152. An edge computing system associated with network cells located in the vicinity of congested region 342 may determine that only a low bitrate BD3 may be available to devices in region 342. In various embodiments, edge computing systems 130 may exchange network traffic information with server 120 and ABR server 160 to determine what bitrate can be made available to user devices in different network cells. As shown in FIG. 3B, user devices may interact with edge computing systems 131 and 132, and computing systems 131 and 132 may interact with servers 160 and 120. Thus, information about the location of user devices 151 and 152 may be available to all of the devices of system 100, as shown in FIG. 1.

While, in some embodiments, application 146 of system 131 may determine to use bitrate BD1 to provide a high-resolution video stream to user device 151, in alternative embodiments, knowing that user device 151 will enter congested region 342 that has only BD3 bitrate available, application 146 may be configured to provide user device 151 with a resolution for the video stream supported by bitrate BD3. Such an approach may prevent a user of device 151 from experiencing a loss of resolution when user device 151 enters region 342, having bitrate BD3. In an alternative embodiment, application 146 may determine bitrate BD4 (not shown in FIG. 3B) that may be less than BD1 but greater than BD3. While providing to user device 151 video data at a bitrate of BD4, application 146 may preload some of the data of the video stream such that when user device 151 enters region 342, it may not experience a decrease in video data resolution. In various embodiments, video-on-demand content may be preloaded, while live stream may be preloaded only if it is played on user device 151 with a delay. In some embodiments, application 146 may be configured to select bitrate BD4 and cache-sufficient amount of data for the video stream for device 151, such that the video resolution may not decrease as user device 151 passes congested region 342. In other cases, depending on values of bitrate BD1, BD3, and BD4, application 146 may be configured to slowly transition user device from receiving video data at bitrate BD4 to receiving the data at bitrate BD5 (e.g., bitrate BD5 may correspond to a network cell 353, as shown in FIG. 3B). Such slow transition from BD4 to BD5 may result in high user satisfaction as opposed to providing user device the video stream at a high resolution of BD1, then significantly decrease the resolution to BD3, as user device 151 enters region 342, and then increase the resolution to BD5 as user device 151 enters network cell 353.

It should be noted that having centralized servers 120 and 160 may be advantageous, as they may control the overall communication of information to various edge computing systems related to network traffic and bitrate for different devices. For example, similar to device 151, bitrate for device 152 may be allocated taking into account location of both devices 151 and 152, motion of devices 151 and 152, as well as other factors (e.g., type of shows watched by user 121 (as shown in FIG. 1) and user 122, profile of users 121 and 122, and the like). In various embodiments, server 170 may maintain information about preferences of users 121 and 122, and such information may be further used to modify bitrates for user devices 151 and 152 to provide maximum satisfaction to users 121 and 122.

It should be noted that various considerations on how to allocate bitrate for different users are interdependent, and the iterative process may be used to obtain a maximum net user satisfaction. The net user satisfaction may be a numerical value that may be calculated by averaging user satisfactions. As previously noted, user satisfaction may be represented by a numerical value that may be a function that depends on various factors described below in relation to FIG. 4. User satisfaction may be optimized subject to a fairness constraint that includes providing a fair allocation of bitrate to various user devices.

Figure 4:
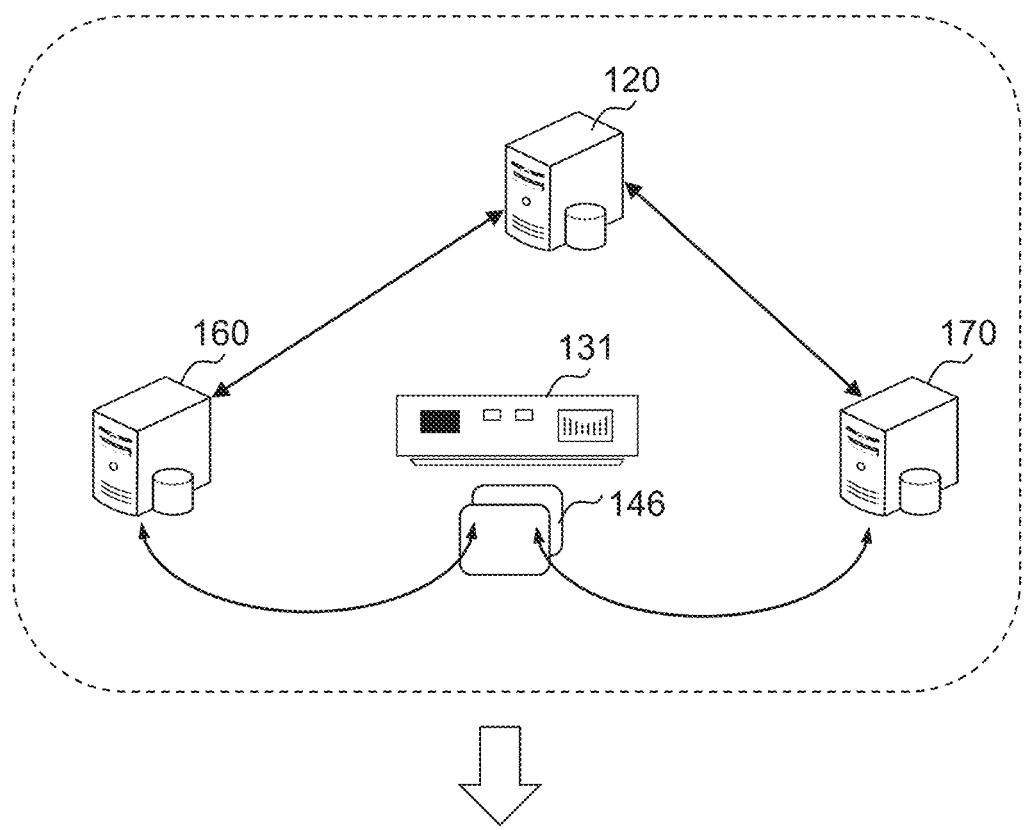
FIG. 4 shows example factors affecting a bitrate allocation for various user devices within a network.

FIG. 4 shows various factors that may affect user satisfaction. The factors may be controlled by servers 120, 170 ABR server 160, and/or application 146 of an edge computing system. As previously explained in relation to FIGS. 2 and 3, server 120 may be a network analytics server designed to predict network traffic and collect information the network traffic. Server 120 may collect information about network traffic for a group of network cells (e.g., cells 200, as shown in FIGS. 2 and 3) and communicate information about network traffic to an edge computing system (e.g., system 131). In various embodiments, server 120 may also communicate the network traffic information to ABR server 160 and CVBA server 170, as shown in FIG. 4 by related arrows. ABR server 160 may be configured to collect information from servers 120 and 170, and choose an optimal bitrate selection policy for user devices communicating with a given edge computing system (e.g., device 151 communicating with system 131) to optimize a user satisfaction. As shown in FIG. 4, application 146 of edge computing system 131 is also used to control user satisfaction by determining allocation bitrate for user devices as well as a bitrate for data streaming.

User satisfaction may be a numerical measure of the user's quality of experience and may depend on several key factors outlined below and shown in FIG. 4. The first factor (herein referred to as a fairness 401) may require that average bitrate for all the devices (that have the same screen size) in the network cell served by edge computing system 131 is the same. In various embodiments, a numerical value may be assigned to the first factor. For example, when the first factor is zero, low fairness is observed (e.g., bitrates may vary greatly among devices), and when the first factor is a hundred, high fairness is observed (e.g., the bitrate is the same (on average) for all the devices). The average bitrate may be calculated by averaging a bitrate over a time period of a minute, a few minutes, ten minutes, an hour, and the like. ABR server 160 may determine the value of fairness 401 and the extent to which user satisfaction is affected by fairness 401 for users 121-123 of user devices 150.

Users 121-123 may expect fairness from a content distribution system and may not join a content distribution network if the fairness is not observed. In some embodiments, fairness may be best measured not by a bitrate but by quality for streaming data transmitted to user devices 150. For example, users 121-123 may expect the same average quality for the streaming data for all the devices (that have the same screen size) in the network cell served by edge computing system 131. It should be noted that quality may be the same for different devices, while bitrates for different devices may be different. For example, for a user device that listens to audio, the quality of sound may be the same as the quality of sound for another device that plays a video file. The bitrate for the audio may be lower than the bitrate for the video. In some cases, some of the video streams that do not contain significant changes between frames (e.g., video content corresponding to a news program) may have the same video quality as the video streams that include significant changes between frames (e.g., video content corresponding to an action movie), while requiring significantly lower bitrate. For example, a news program may use a first type encoding, and an action movie may use a second type of encoding, where the video quality (as assessed by an appropriate metrics) may be the same for the news program and the action movie. The bitrate used by the first encoding may, however, be substantially smaller than the bitrate used by the second encoding.

The target video quality may be determined using any suitable methods. For example, an objective test may compute the amount of distortion of a video stream due to encoding by finding a difference between the original content and the encoded content. A simple and common method, known as the signal-to-noise ratio (SNR), can be a good example of objective measurement, which quantifies the distortions due to the encoding by expressing it as a noise. The objective tests may vary for different digital content and may include spectral distortion (SD), root-mean-squared error (RMSE), mean squared error (MSE), peak signal-to-noise ratio (PSNR), and segmental signal-to-noise ratio (SEGSNR). It should be noted that any other suitable test may be performed for an image/video quality assessment metric (IQA) that may include determining structural similarity metric (SSIM), or a video multimethod assessment fusion (VMAF) metric, or a Stream Video Quality metric (SVQ), or the average frame QP metric, for an encoded video stream.

As noted above, fairness factor 401 may imply that average resolution for a video streaming (or audio) for any device within a network cell may remain the same. Thus, bitrates for different devices may be chosen, such that the average resolution for all the devices in the network cell is the same. In some cases, for some devices, a bitrate may be capped based on a screen type or a screen size of the device. In some cases, fairness 401 may not be strictly adhered. For example, user devices that just joined a network cell may receive a higher bitrate temporarily to smooth out a bitrate transition from a high bitrate to a lower bitrate. In some embodiments, shorter viewing sessions may receive a larger bitrate than longer viewing sessions, as shorter sessions may reduce network traffic. In some cases, static (i.e., non-moving devices such as television sets) may receive a higher bitrate.

The second factor (herein referred to as stability 402) may require that the quality of streaming data does not change rapidly due to variations in the network traffic. For example, user satisfaction may be low if a video quality (e.g., video resolution) changes from high to low rapidly (e.g., within a time of one minute, a few minutes, five minutes, and the like). In some cases, when resolution changes by as much as five percent, such change may lead to a decrease in user satisfaction. Stability 402 may affect various users differently. For example, user 121 of device 151 may be very dissatisfied with the unstable bitrate, while user 122 of device 152 by be mostly unaffected by the unstable bitrate.

In various embodiments, a numerical value may be assigned to the second factor. For example, when the second factor is zero, low stability is observed (e.g., a bitrate may vary greatly with time), and when the second factor is a hundred, high stability is observed (e.g., a bitrate is mostly constant as a function of time). The variations in the bitrate may be calculated by calculating a bitrate variance over a time period of a minute, a few minutes, ten minutes, an hour, and the like. CVBA server 170 may determine the value of stability 402 and the extent to which user satisfaction is affected by stability 402 for users 121-123 of user devices 150. In various cases, application 146 may be configured to increase a bitrate for a user device (e.g., device 151) when the increased bitrate over a duration of a video session results in the stable viewing session (i.e., stability factor 402 is high). It should be noted that the second factor provides a rather simplified indication on the stability of the bitrate for user device 151 and other, more accurate measures indicating time-variations of the bitrate may be used. For example, a time derivative of the bitrate as a function of time may be used, as well as various statistical quantities that may be calculated based on the time derivative. For example, an average of the time derivative over a given time period may be used, a standard deviation of the time derivative over the given time period, and the like. In some cases, bitrate for a device (e.g., device 151) may be configured not to change significantly (i.e., the average of the time derivative may be approximately zero) over a given time period (also previously referred to as stability period) when device 151 moves from one network cell to another (e.g., when device 151 enters a congested network cell while consuming streaming content at a higher bitrate compared to a bitrate allocated for the congested network cell. The third factor (herein referred to as a bitrate decrease 403) may require that the quality of streaming data may not decrease with time (or may not substantially decrease with time). For example, user satisfaction may significantly decrease if the quality of the streaming data decreases. In some cases, it might be preferred to provide a user with a lower quality streaming data than a high quality that can be provided to the user at the start of the streaming session, in order to avoid user dissatisfaction when lowering the quality of the streaming data from the high quality to a lower quality later on. In various embodiments, a bitrate for a device may be increased when it is predicted that the bitrate is unlikely to be decreased later on. For example, application 146 of edge computing system 131 may increase a bitrate for a user device if servers 120 and 160 predict (based on information about network traffic) that the bitrate would not need to be decreased within a time window of a minute, five minutes, ten minutes and the like. The time window for which stability of the bitrate is required may be a function of a session type (e.g., a video-on-demand session, linear television, and the like), a function of a type of content (e.g., news, sports, movies, and the like) or a function of a behavior of a user (e.g., the user who watches a single television show for a given duration of time may require stability of the bitrate for that given duration of time, while the user who watches video clips may not require stability of the bitrate for an extended duration of time).

In various embodiments, a numerical value may be assigned to the third factor. For example, when the third factor is zero, a large bitrate decrease is observed (e.g., the bitrate may vary greatly with time), and when the third factor is a hundred, a bitrate decrease is not observed (the bitrate may increase when the third factor is a hundred). CVBA server 170 may determine the value of bitrate decrease 403 and an extent to which user satisfaction is affected by bitrate decrease 403 for users 121-123 of user devices 150.

The fourth factor (herein referred to as a smooth transition 404) may require that when a mobile device transitions from one network cell to another network cell, the quality of streaming data is not changed rapidly. Any rapid decrease in the quality of the streaming data may lead to low user satisfaction (i.e., significant user dissatisfaction). Similarly, it may be preferred to improve the quality of the streaming data slowly when moving from a congested network cell to a network cell with light traffic. Similar to other factors, a numerical value may be assigned to the fourth factor. For example, when the fourth factor is zero, a bitrate may change rapidly, and when the fourth factor is a hundred, a bitrate change may not be observed. CVBA server 170 may determine the value of bitrate change 404 and the extent to which user satisfaction is affected by bitrate change 404 for users 121-123 of user devices 150.

Figure 5A:
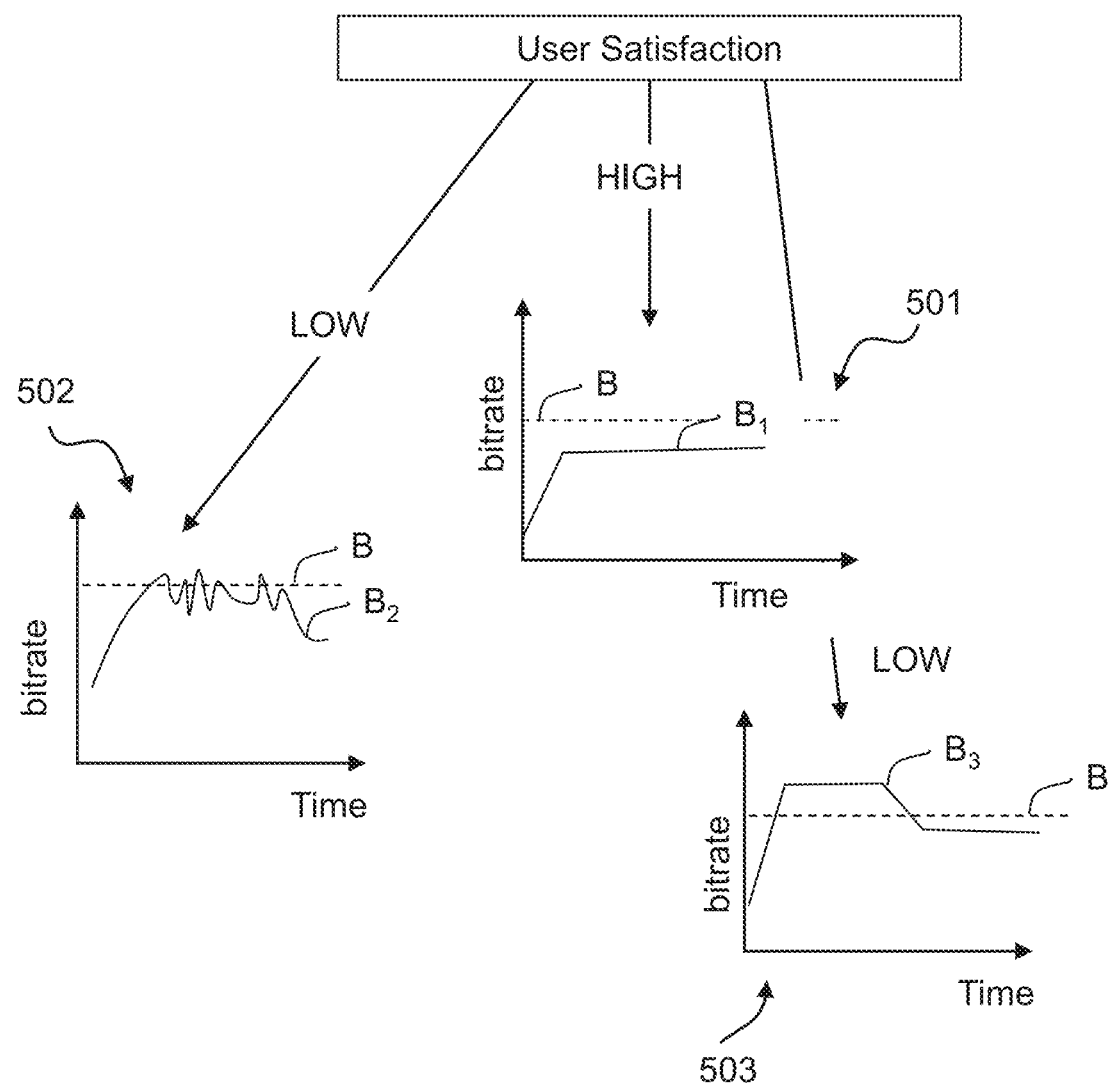
FIG. 5A shows example bitrate graphs with bitrate being a function of time consistent with disclosed embodiments.

FIG. 5A illustrates several graphs 501 502 and 503, displaying a bitrate as a function of time. For example, graph 502 shows the bitrate that experience multiple fluctuations for the bitrate $B_2$ around a bitrate value B. Such fluctuations may lead to low stability factor 402. Graph 503 may show an increase in a bitrate $B_3$ following a decrease in the bitrate. The decrease in bitrate $B_3$ may lead to low bitrate decrease factor 403. Due to low factors 402 and 403, graphs 502 and 503 may lead to low user satisfaction. Graph 501, on the other hand, may lead to a higher user satisfaction due to high values for stability factor 402 and high values for factor 403. As shown by graph 501, even though bitrate $B_1$ may be lower than B (opposite to some regions in graphs 502 and 503 where bitrates $B_2$ and $B_3$ are higher than B), user satisfaction for graph 501 may be higher.

Figure 5B:
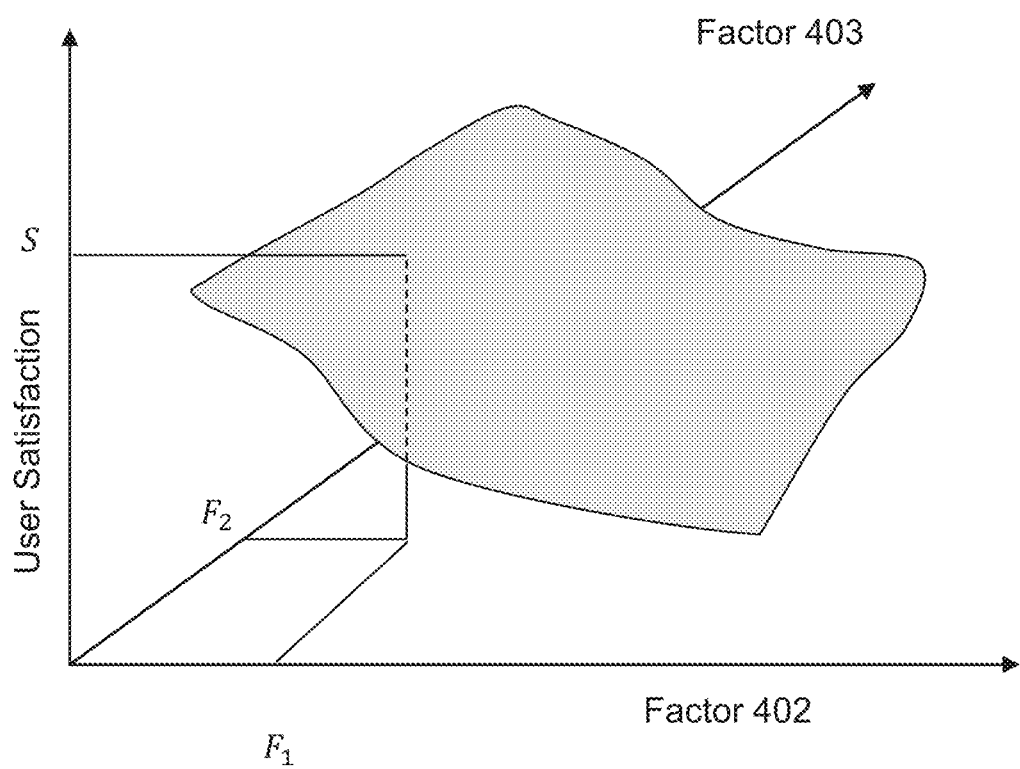
FIG. 5B shows an example user satisfaction as a function of various factors consistent with disclosed embodiments.

FIG. 5B shows an example of user satisfaction that may have an assigned numerical value and may depend on factors 401-404 described in connection with FIG. 4. In an example embodiment, user satisfaction may change values depending on values of various factors (e.g., factors 402 and 403, as shown in FIG. 5B). For example, when factor 402 has a value of $F_1$ and factor 403 has a value of $F_2$, user satisfaction may have a value S, as shown in FIG. 5B. In various embodiments, servers 120, 160 and 170 together with application 146 of edge computing systems 130 may be configured to optimize a net user satisfaction for every network cell which, for a given network cell, may be a calculated as an average (or weighted average) of all the user satisfaction within that cell. The weights for the weighted average may be selected using any suitable approach. For example, the weights for larger static devices may be larger than weights for smaller mobile devices. In some cases, weights may be selected based on payments made by a user (e.g., user 121) to a content service provider.

Figure 6:
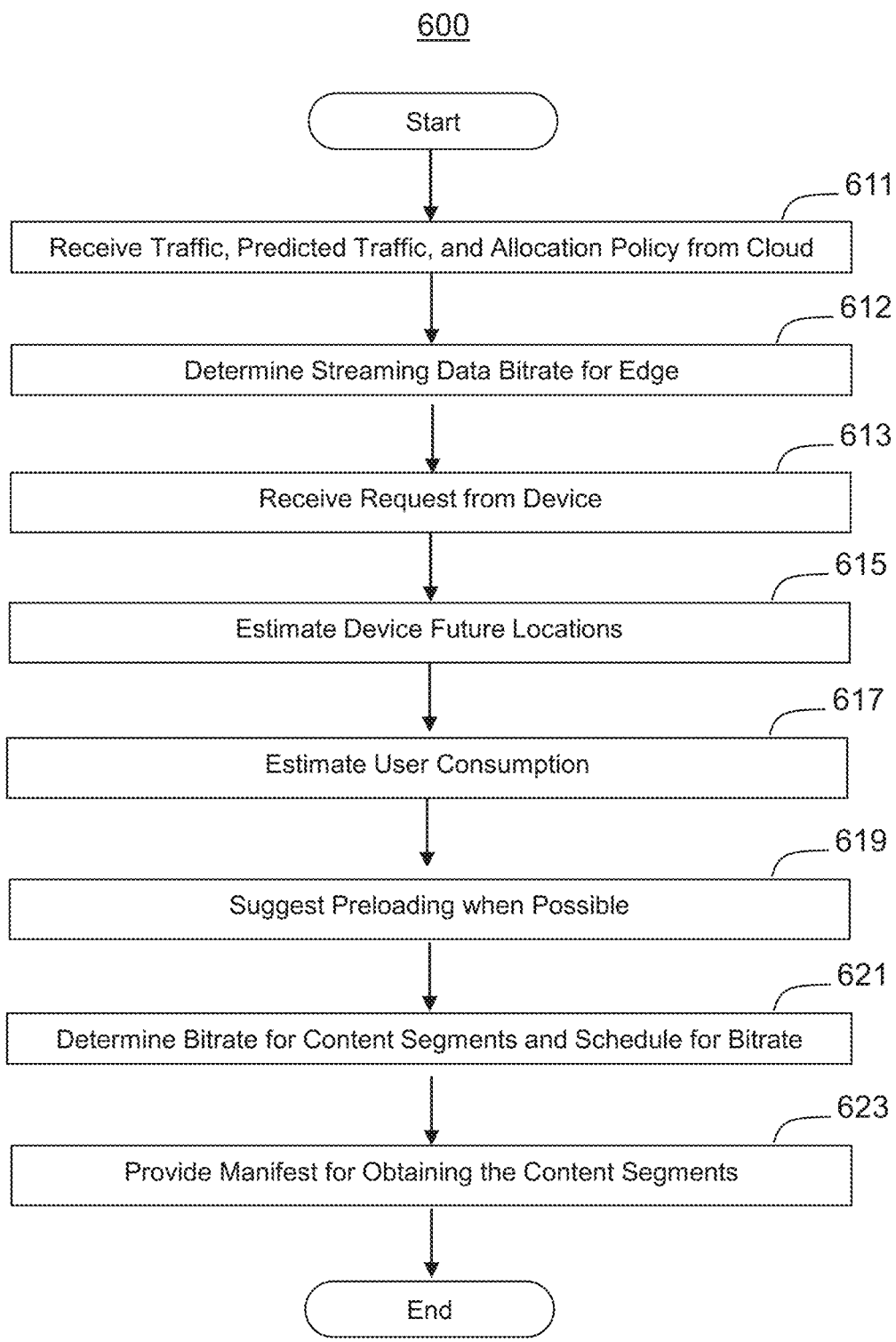
FIG. 6 shows an example process for determining the bitrate for a user device consistent with disclosed embodiments.

FIG. 6 shows an example process 600 for providing a bitrate for a user device consistent with disclosed embodiments. At step 611 of process 600, system 100 (as shown in FIG. 1) may be configured to determine network traffic using, for example, server 120, as previously described. In an example embodiment, at least some of the information about the network traffic may be communicated to server 120 via server 110 from an edge computing system. For instance, as shown in FIG. 1, data 144 that includes network traffic information may be communicated by system 131 to server 120 via server 110. In an example embodiment, server 120 may also be used to predict the network traffic at future times. The determined network traffic may be communicated to server 160 for determining selection policy 142A or 142B, as shown in FIG. 1 and previously described. Further, at step 611, the predicated network traffic and selection policy may be communicated to one of edge computing systems 130. For instance, policy 142A may be communicated to edge computing system 131, as shown in FIG. 1.

At step 612, an edge computing system (e.g., system 131) may be configured to determine an amount of streaming data that can be handled by system 131 per unit of time (streaming data bitrate for edge computing system 131). The determination of streaming data bitrate depends on the hardware of system 131 (e.g., a number of processors available to system 131, an amount of memory available for system 131, the bandwidth of one or more transceivers associated with system 131, and the like). Further, the streaming data bitrate may be affected by software of system 131 (e.g., application 146). In various embodiments, at step 612, system 131 may determine the overall streaming data bitrate for system 131 and an allocated bitrate for different user devices 150 based on the overall streaming data bitrate and the number of user devices connected to system 131. Further, historical data about a number of devices connected at that time (season, month, weekday, etc.) may be taken into account.

At step 613, an edge computing system (e.g., system 131) may receive the request for a data stream from a user device (e.g., device 151), and the request may be forwarded by system 131 to server 190 for obtaining the requested data.

At step 615, system 100 may use server 120 to estimate future locations of device 151. For example, if device 151 is traveling along a stretch of a roadway (e.g., a highway) or if user 121 of device 151 is using public transportation (e.g., a train, a bus, and the like), some of the future locations of device 151 may be predicted. For instance, if device 151 is traveling from point A to point B (as shown in FIG. 3B), future locations of device 151 may be predicted along roadway 340 traveled by device 151. Alternatively, future locations of device 151 may be estimated using one or more edge computing systems 130, and the estimated future locations may be communicated from one edge computing system to another. Edge computing system 131 may predict that device 151 will enter a region 342, as shown in FIG. 3B. Such information may be communicated to system 132.

At step 617, system 100 may be configured to use server 170 to estimate user consumption of data for user 121. For example, server 170 may determine that a user is typically consuming 30 minutes of a video for a particular television show while traveling using public transportation from point A to point B (as shown in FIG. 3B). Server 170 may then communicate typical consumption patterns (for a particular time and a particular user) to ABR server 160 and/or to application 146 of edge computing system 131. In some cases, server 170 may determine that a user of a user device (e.g., user 122 of device 152) only watches small video clips. Such information may be communicated to application 146 of system 131 for further determining how to allocate a bitrate for different user devices. Further, at step 617, application 146 may compute stability periods, as defined above, based on user consumption pattern, content type, and the like.

Alternatively, at step 617, system 100 may be configured to use an edge computing system (e.g., system 131) to receive from a user (e.g., user 121) a profile containing the user's viewing patterns, as well as the user's typical commute and/or typical location (or locations). Additionally, computing system 131 may obtain from data system 106 details about content requested by device 151, such as a type of the content (e.g., a movie, news, etc.) a title, a genre, a duration of the content, and the like. Server 170 may then contribute in determining bitrate selection policy 142A based on the content details (e.g., the type of the content).

At step 619, application 146 may determine that some of the segments of content 145 may be preloaded to a user device (e.g., user device 151) when preloading is possible. In an example embodiment, such preloading may be used to allow device 151 to pass through a congested area (e.g., region 342, as shown in FIG. 3B) without a significant reduction in a bitrate, and therefore a reduction in the quality, of the streaming data.

At step 621, application 146 may be configured to determine a bitrate for segments of content 145. For example, based on the information about the network traffic and expected future network traffic, application 146 may be configured to determine bitrate for encoding segments of content 145. Further application 146 may be configured to determine a bitrate schedule for user devices 150 to maximize net user satisfaction as further described below.

The bitrate schedule for a user device (e.g., device 151) determines the time dependence of a bitrate for device 151. While maximizing net user satisfaction, application 146 may be configured to attempt to optimize (i.e., maximize) user satisfaction for each user (e.g., users 121-123, as shown in FIG. 1). In an example embodiment, however, if small decrease in user satisfaction for one user (e.g., user 123) may lead to a significant increase in user satisfaction for users 121 and 122, such decrease in user satisfaction for user 123 may be warranted to achieve an overall maximum net user satisfaction. Thus, the bitrate for a given device may not necessarily be constant but may slightly change with time. Such change in the bitrate with time (i.e., a bitrate schedule) may be determined for each user device to optimize satisfaction for all the users. The bitrate may change with time due to increased/decreased traffic, maintenance of hardware of system 131, or any other factors that may affect the bitrate to user devices connected to system 131. The bitrate schedule may determine a bitrate allocation not only for the present time but for future times, based on information about network congestion, user consumption patterns, and the like. Application 146 may periodically reevaluate the bitrate allocations for user devices 150 in light of newly received information about the network traffic, user preferences and the like. Application 146 may optimize net user satisfaction by selecting a bitrate for devices 150. In various embodiments, application 146 may be configured to optimize a net user satisfaction for devices 150 located at a given network cell. To optimize net user satisfaction, application 146 may use a combination of factors 401-404, as described above, and information about the network traffic. For example, the user satisfaction may be maximized by maximizing the stability of the data stream, minimizing loss of a bitrate to a user device, providing a smooth bitrate transition from one network cell to another network cell, and providing equality of the bitrate for user devices 150 located in the network cell. In various embodiments, optimizing the user satisfaction may include optimizing an average value of the user satisfaction, where the average value may be computed over a period of time (e.g., a minute, a few minutes, ten minutes, an hour, and the like). In various embodiments, the net user satisfaction may be computed as an average of user satisfactions for users 121-123.

In various embodiments, application 146 may be configured to determine future bitrate schedule for a user device (e.g., device 151) based on past bitrates provided to user device 151. For example, application 146 may be configured to record a bitrate history for user device 151 and use the bitrate history as additional information for improving user satisfaction. For example, the bitrate history may be used to ensure that the bitrate for user device 151 is not decreased significantly in the future (i.e., factor 403 is high (low bitrate decrease)). In an example embodiment, if user device 151 just moved into a network cell from an adjacent network cell, a bitrate for device 151 may be the same as the bitrate used in a previous cell to maintain a smooth transition in the bitrate from one network cell to another. In a case when user device 151 initiates a streaming session in a network cell, device 151 may get the same bitrate allocation as other user devices located in the network cell (that have the same screen size as user device 151).

Similar to the bitrate schedule that may depend on time, a bitrate for encoding content 145 for user device 151 may change as a function of time. Application 146 may determine the bitrate as a function of time based on network traffic, predicted network traffic, or other factors related to movements of device 151. For example, if device 151 is moving from a first network cell managed by edge computing system 131 to a second network cell managed by edge computing system 132, application 146 of system 132 may provide the same bitrate for device 151 as the bitrate provided for user device 151 in the first network cell. Additionally, application 146 may provide for user device 151 the same bitrate as the bitrate provided for user device 151 in the first network cell.

At step 623, edge computing systems 130 may provide user devices 150 with manifest file 143 (as shown in FIG. 1) for segments of content 145, and players of user devices 150 may retrieve the segments for playback.

It should also be noted that while application 146 of an edge computing system may be used for maximizing net user satisfaction, application 146 may also be configured to allocate the bitrate efficiently, that is application 146 may be configured to provide all (or most) of the available bitrate for a given network cell to the devices 150 located in that network cell.

Further, in some embodiments, the bitrate allocation for user 121 may depend on a type of content consumed by user 121. For example, if user 121 is downloading a work-related file, and user 122 is playing a video game, application 146 may be configured to allocate a larger bitrate for user 121 as compared to the bitrate for user 122. In another embodiment, if user 122 is streaming video data, and user 121 is downloading a file, a bitrate for user 122 may be configured to be higher.

It should be noted that some (or all) of the operations of servers 120-170 may be done by edge computing system 130. In an example embodiment, edge computing system 131 may use any suitable software applications that may perform operations of server 120-170, and allocate bitrates for devices located in an area (e.g., a network cell) served by system 131 using application 146.

In various embodiments, system 131 may exchange information with other edge computing systems (e.g., system 132) via servers 120-170 to obtain network traffic, selection policies, and user preferences at the adjacent network cells. In various embodiments, any suitable information may be exchanged between computing systems 131 and 132 via servers 120-170.

Various approaches for optimizing the net user satisfaction described here are only illustrative, and other approaches may be used. In various cases, factors 401-404 may affect the net user satisfaction. The approaches for optimizing net user satisfactions may change over time as viewing habits of users change, network conditions change, and an allocated bitrate per screen type and size changes. Also, it should be noted that implementing bitrate allocations using edge computing systems may enable the use of thin clients. Further, bitrate allocation algorithms, when implemented on servers or edge computing systems, may work with any suitable player playing any suitable video format (e.g., HLS, HSS, or DASH).

The disclosed systems and methods may be applicable to various data streaming services and may be adaptable to different delivery infrastructures. For example, the disclosed systems and methods can be used with multiple encoding, encryption, and packaging technologies. The disclosed methods may be employed with multiple packaging technologies such as common media application format (CMAF), MPEG-DASH, HTTP live streaming (HLS), among others. Further, the disclosed systems and methods may be independent of the streaming mode used by the client. Further, the disclosed systems and methods can operate with any version of HTTP(s) and caching protocols.

As described above, system 100, as shown in FIG. 1, may include various devices, such as processors, memory devices, and various user devices (e.g., devices 150). For example, user devices 150 may include one or more computing devices configured to perform one or more operations consistent with disclosed embodiments. For example, user devices 150 may include a desktop computer, a laptop, a server, a mobile device (e.g., tablet, smartphone, etc.), a set-top box, a gaming device, a wearable computing device, or another type of computing device. User devices 150 may include one or more processors configured to execute software instructions stored in memory, such as memory included in user devices 150 to perform operations to implement the functions related to requesting content, receiving the content, and playing the content. User devices 150 may be configured for wired and/or wireless communications and may include software that, when executed by a processor, performs internet-related communication (e.g., TCP/IP) and content display processes. For instance, user devices 150 may execute browser software that generates and displays interfaces, including content on a display device included in, or connected to, user devices 150. User devices 150 may execute one or more applications that allow user devices 150 to communicate with components over system 100, and generate and display content in interfaces via display devices included in user devices 150. For example, user devices 150 may display a media player to output content received from edge computing system 131.

The disclosed embodiments are not limited to any particular configuration of user devices 150. For instance, a client device 150 may be a mobile device that stores and executes an application to perform operations for requesting, receiving, and playing the content. In certain embodiments, user devices 150 may be configured to execute software instructions relating to location services, such as GPS locations. For example, user devices 150 may be configured to determine a geographic location and provide location data and time stamp data corresponding to the location data to edge computing system 131.

As described above, system 100, as shown in FIG. 1, may include cloud system 105, data system 106, and edge computing systems 130. Servers 110-170, CDN 180, and server 190 (herein referred to as servers 110-190, as CDN 180 may comprise one or more servers) may include one or more computing systems that perform operations to store and provide content. Servers 110-190 may include databases that include content, such as videos or movies. Servers 110-190 may also include processors that perform authentication functions of user devices 150, users of user devices 150, and/or resolve client identities based on client IDs and/or a secure token. In some embodiments, servers 110-190 may include processors configured to encode content and package content in different formats. Further, servers 110-190 may include processing devices to resolve URLs. In some embodiments, servers 110-190 may include multiple core processors to handle concurrently multiple operations and/or streams. For example, server 190 may include parallel processing units to concurrently handle requests of multiple user devices 150.

Databases 111 and 112 may include one or more computing devices configured with appropriate software to perform operations for providing content to server 110. Databases 111-112 may include, for example, Oracle™ database, Sybase™ database, or other relational databases or non-relational databases, such as Hadoop™ sequence files, HBase™, or Cassandra™. In an illustrative embodiment, database 111 (or database 112) may include computing components (e.g., database management system, database server, etc.) configured to receive and process requests for data stored in memory devices of the database and to provide data from the database.

Database 111 may be configured to collect and/or maintain the data associated with user accounts and user preferences. For example, database 111 may store information about user privileges. Database 111 may collect the data from a variety of sources, including, for instance, online resources.

Network system 100 may include any types of connections between various computing components. For example, network system 100 may facilitate the exchange of information via network connections that may include Internet connections, Local Area Network connections, near field communication (NFC), or other suitable connection(s) that enable the sending and receiving of information between the components of system 100. In some embodiments, one or more components of system 100 may communicate directly through a dedicated communication link(s).

As described above, edge computing system 131 may transmit content to user device 151. System 131 may store content in local memories, such as caching infrastructures associated with system 131, local proxies, and/or the HTTP caching capability. In some embodiments, system 131 may perform functions such as routing content, resolving domain systems, handling content requests, and creating sessions with user devices 150 for content delivery. System 131 may obtain information from other computing systems (e.g., servers 110-170, as shown in FIG. 1), arrange it for user devices 150, and deliver it to user devices 150. In such embodiments, system 131 may be configured to handle multiple streams in parallel, such as providing different data streams to multiple user devices 150. Further, system 131 may be configured to provide authentication credentials to user devices 150. For example, system 131 may provide a secure cookie, or an equivalent technique for authentication, at a session startup time.

In some embodiments, edge computing system 131 may take the form of a server, a general-purpose computer, a mainframe computer, or any combination of these components. In other embodiments, edge computing system 131 may be a virtual machine. System 131 may be configured to communicate with one or more databases, such as databases 111 and 112, and other elements of system 100 either directly or via network connections.

System 131 may include one or more storage devices configured to store instructions used by processors of system 131 to perform functions related to disclosed embodiments. For example, memory storage devices may store software instructions.

In some embodiments, processors of system 131 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, the processors may be a plurality of devices coupled and configured to perform functions consistent with the disclosure. For example, the processors may include a plurality of co-processors, each configured to run specific edge computing system 131 operations such as floating-point arithmetic, graphics, signal processing, string processing, cryptography or I/O interfacing. In some embodiments, processors may include a field-programmable gate array (FPGA), central processing units (CPUs), graphical processing units (GPUs), and the like.

It is to be understood that the configuration and the functionality of components of network system 100 have been defined herein for the convenience of the description. Alternative configurations can be defined as long as the specified functions and relationships thereof are appropriately performed. Alternatives (including equivalents, extensions, variations, deviations, etc., of those described herein) will be apparent. Such alternatives fall within the scope and spirit of the disclosed embodiments.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application; such examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents which may be resorted to fall within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A method for providing data to a device, the method comprising:
   receiving a location of the device;
   determining a network cell representing a dynamic area of connectivity associated with the location;
   determining network traffic at the network cell and at other network cells;
   receiving a request for a data stream from the device;
   optimizing a net user satisfaction, wherein the net user satisfaction is an average of user satisfactions for a plurality of users of a plurality of devices located within the network cell, by performing steps comprising:
   determining a plurality of future bitrate schedules of the plurality of devices; and
   determining a plurality of bitrates for the plurality of devices that minimize a reduction in bitrate in the future bitrate schedules;
   selecting a bitrate for the data stream based on the determined plurality of bitrates;
   generating a manifest file containing information associated with one or more segments of the data stream and the selected bitrate; and
   transmitting the manifest file to the device.

2. The method of claim 1, wherein optimizing the net user satisfaction is accomplished within constraints of fairness, wherein the fairness comprises a numerical function indicating average quality for streaming data for the plurality of devices located within the network cell.

3. The method of claim 1, wherein optimizing the net user satisfaction includes preventing loss of the bitrate over a period of time by:
   determining a first bitrate available at a first time;
   determining a second bitrate available at a second time, wherein the second time is after the first time; and
   selecting a third bitrate that is equal to or lower than the second bitrate for the first time when the second bitrate is lower than the first bitrate.

4. The method of claim 1, wherein optimizing the net user satisfaction includes performing a smooth transition in the bitrate.

5. The method of claim 1, wherein the net user satisfaction is further computed by averaging over a period of time the average of user satisfactions.

6. The method of claim 1, wherein the network traffic at an adjacent network cell is used to estimate a possible adjacent bitrate for the data stream when the device moves to the adjacent network cell.

7. The method of claim 6, wherein selecting the bitrate for the data stream comprises selecting a lowest of the bitrate for the network cell or the estimated adjacent bitrate.

8. The method of claim 6, further comprising estimating a movement of the device.

9. The method of claim 8, further comprising:
   determining another network cell to which the device is moving;
   estimating a future change in the bitrate due to a device motion; and
   changing the bitrate to facilitate preloading a portion of the data stream by the device, when the estimated future change in the bitrate is negative, and when data of the data stream is available for preloading.

10. The method of claim 8, further comprising:
    determining another network cell to which the device is moving;
    determining a change in the bitrate due to a device motion; and
    performing a smooth transition in the bitrate corresponding to the determined change.

11. The method of claim 8, wherein selecting the bitrate for the data stream comprises selecting the bitrate such that a change in the bitrate is non-negative.

12. The method of claim 3, further comprising predicting the network traffic at the network cell, wherein predicting the network traffic includes collecting viewing and behavioral analytics for the device.

13. The method of claim 12, wherein predicting the network traffic includes time series analysis.

14. The method of claim 12, wherein predicting the network traffic includes roadway traffic flow analysis.

15. The method of claim 12, wherein predicting the network traffic includes applying one or more machine-learning algorithms.

16. A system comprising one or more edge computing systems communicatively coupled to one or more devices, at least one edge computing system performing operations comprising:
    receiving a location of one of the one or more devices;
    determining a network cell representing a dynamic area of connectivity associated with the location;
    determining network traffic at the network cell and at an adjacent network cell;
    receiving a request for a data stream from the device;
    optimizing a net user satisfaction, wherein the net user satisfaction is an average of user satisfactions for a plurality of users of a plurality of devices located within the network cell, by performing steps comprising:
    determining a plurality of future bitrate schedules of the plurality of devices; and
    determining a plurality of bitrates for the plurality of devices that minimize a reduction in bitrate in the future bitrate schedules;
    selecting a bitrate for the data stream based on the determined plurality of bitrates;
    generating a manifest file containing information associated with one or more segments of the data stream and the selected bitrate; and
    transmitting the manifest file to the device.

17. The system of claim 16, wherein the at least one edge computing system is configured to communicate with the devices located within the network cell.

18. The system of claim 16, wherein the edge computing systems are configured to receive network-related information from another computing system configured to collect the network-related information.

19. The system of claim 16, wherein determining the network traffic at the network cell and at the adjacent network cell comprises:
   sending a request for traffic information to a network analytics server; and
   receiving the traffic information from the network analytics server.

20. The system of claim 19, wherein the network analytics server is configured to use roadway traffic data for predicting the network traffic.

21. A non-transitory computer readable medium including instructions that, when executed by at least one processor, cause the at least one processor to perform operations comprising:
   receiving a location of a device;
   determining a network cell representing a dynamic area of connectivity associated with the location;
   generating a network cell map including a plurality of devices;
   determining a motion vector for the device in the generated network cell map;
   determining network traffic at the network cell and at an adjacent network cell to which the device is moving;
   receiving a request for a data stream from the device;
   determining a plurality of future bitrate schedules of the plurality of devices based on:
   the network traffic at the network cell; and
   the network traffic at the adjacent network cell;
   determining a plurality of bitrates for the plurality of devices that minimize a reduction in bitrate in the future bitrate schedules;
   optimizing a user satisfaction by selecting a bitrate for the data stream based on the determined plurality of bitrates;
   generating a manifest file containing information associated with one or more segments of the data stream and the selected bitrate;
   transmitting the manifest file to the device; and
   collecting viewing and behavioral analytics for the device associated with user dissatisfaction based on change in bitrate.

22. The non-transitory computer readable medium of claim 21, wherein the selection of the bitrate is based on a type of the requested data stream.

* * * * *